(12) United States Patent
Proctor et al.

(10) Patent No.: US 7,912,801 B2
(45) Date of Patent: Mar. 22, 2011

(54) METHOD AND APPARATUS TO DEFINE A RULEFLOW

(75) Inventors: Mark Proctor, Chiswick (GB); Kris Verlaenen, Rotselaar (BE)

(73) Assignee: Red Hat, Inc., Raleigh, NC (US)

( * ) Notice: Subject to any disclaimer, the term of this patent is extended or adjusted under 35 U.S.C. 154(b) by 957 days.

(21) Appl. No.: 11/809,611

(22) Filed: May 31, 2007

(65) Prior Publication Data
US 2008/0301079 A1   Dec. 4, 2008

(51) Int. Cl.
*G06N 5/02* (2006.01)
*G06N 5/04* (2006.01)
*G06N 7/06* (2006.01)

(52) U.S. Cl. ............... 706/46; 706/47; 706/48; 706/59

(58) Field of Classification Search ............... 706/46
See application file for complete search history.

(56) References Cited

OTHER PUBLICATIONS

Schlesinger et al., Rule Modelling and Simulation in ALFRED, 1997.*
Rules in Database Systems, Third International Workshop, RIDS '97, Skövde, Sweden, Jun. 26-28, 1997, Proceedings 1997.*
Blum, "Entwurf und Implementierung einer Benutzerschnittstelle für ALFRED", Mai, 1997.*

* cited by examiner

*Primary Examiner* — Michael B. Holmes
*Assistant Examiner* — Nathan H Brown, Jr.
(74) *Attorney, Agent, or Firm* — Blakely, Sokoloff, Taylor & Zafman LLP (57) ABSTRACT

Some embodiments of a method and an apparatus to define ruleflows for a rule engine have been presented. In one embodiment, a graphical user interface (GUI) is generated to allow a user to graphically specify an execution order of some rules. Then the rule engine is used to execute the rules according to the execution order. The rules may include one or more rule sets, where each rule set contains one or more rules.

24 Claims, 10 Drawing Sheets

METHOD AND APPARATUS TO DEFINE A RULEFLOW

TECHNICAL FIELD

Embodiments of the present invention relate to artificial intelligence, and more specifically to rule engines.

BACKGROUND

Artificial Intelligence (A.I.) is a very broad research area that focuses on "making computers think like people" and includes disciplines like neural networks, genetic algorithms, decision trees, frame systems, and expert systems. Knowledge representation is the area of A.I. concerned with how knowledge is represented and manipulated. Expert systems use knowledge representation to facilitate the codification of knowledge into a knowledge-base, which can be used for reasoning, i.e., this knowledge-base is operable to process data to infer conclusions. Expert systems are also known as knowledge-based systems and knowledge-based expert systems and are considered applied artificial intelligence. The process of developing with an expert system is knowledge engineering.

A rule engine is a suite of software modules that implements an Expert System using a rule-based approach. Generally speaking, a rule is a logical construct for describing the operations, definitions, conditions, and/or constraints that apply to some predetermined data to achieve a goal. For example, a business rule might state that no credit check is to be performed on return customers.

Generally speaking, a rule engine includes a suite of software modules or components that manages and automates the rules to implement the Expert System. For instance, the rule engine evaluates and fires one or more of the rules based on the evaluation. One advantage of a rule engine is the separation of the rules from the underlying application code. For many applications, the rules change more frequently than the rest of the application code. With the rules separated from the application code, the rule engine allows the business users to modify the rules frequently without the help of technical staff and hence, allowing the applications to be more adaptable with the dynamic rules.

The order in which the rules are executed may impact various aspects, such as the outcome of rule execution, overall efficiency of the rule engine, etc. For instance, executing Rule A before Rule B may cause Rule B to be removed. Thus, great care has to be exercised in defining the order of executing the rules. However, as the number of rules increases, the complexity of defining the execution order of the rules also increases, and the process becomes more difficult and error-proned.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method and apparatus to define a ruleflow. A ruleflow as used herein broadly refers to an order in which a set of rules should be executed by a rule engine and one or more conditions, if any, under which the rules should be executed. In one embodiment, a graphical user interface (GUI) is generated to allow a user to graphically specify an execution order of some rules. The rules may be grouped or partitioned into one or more rule sets, where each rule set contains one or more rules. Then the rule engine executes the rules according to the execution order. In one embodiment, a model of the execution order is generated and loaded into the rule engine. An activated rule, which is part of a ruleflow-group, is placed into the corresponding ruleflow-group among a set of ruleflow-groups, instead of an agenda of the rule engine. Activated rules, which are not part of any ruleflow-groups, are placed into the agenda. When a ruleflow-group is ready to be executed according to the execution order, all rules in the ruleflow-group are placed into the agenda to be executed. More details of some embodiments of the rule engine and ruleflow are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Introduction
Overview of a Rule

As mentioned above, a rule is a logical construct for describing the operations, definitions, conditions, and/or constraints that apply to some predetermined data to achieve a goal. In general, a rule is in the form of a two-part structure with a Left Hand Side (LHS) and a Right Hand Side (RHS). Further, a rule may have additional attributes, such as salience, agenda group, auto-focus, activation group, no-loop, duration, etc. In some embodiments, the LHS of a rule includes Conditional Elements (CE) and Columns, which are used to facilitate the encoding of propositional and first order logic. The term Column is used to indicate Field Constraints on a fact. Some examples of CEs include and, or, not, exist, forall, accumulate, etc. Some examples of Field Constraints include Literal Constraint, Bound Variable Constraint, Return Value, Predicate, etc.

As facts are asserted and modified in a working memory, a rule engine matches the facts against the LHS conditions of the rules. When all the LHS conditions of a rule are met and determined to be true, the rule and those matched facts are activated. Conventionally, when a rule is activated, the rule is placed onto an agenda of a rule engine for potential execution, where the Actions of RHS, called the Consequence, are executed. Note that the execution order of rules may affect the outcome of execution because executing one rule may impact the facts and/or the rules. As the number of rules increases, the execution order and the potential effect of the execution order become more complex and thus, a ruleflow is defined to help control the execution order. More details of the ruleflow are discussed below.

In some embodiments, rules are associated with a namespace via a package keyword. A package is a self-contained, deployable, and serializable object, having one or more rules. A package may also be referred to as a rule set. A Package may declare imports, global variables, functions, and rules.

In some embodiments, rules allow a complete de-coupling of data from the logic. Note that rules may not be called directly as they are not methods or functions. Instead, rules fire in response to changes in the data (e.g., facts in the working memory). Rules are also fully declarative in that they describe "what," not "how," like imperative languages, such as Java.

Overview of a Production Rule System

Figure 1:
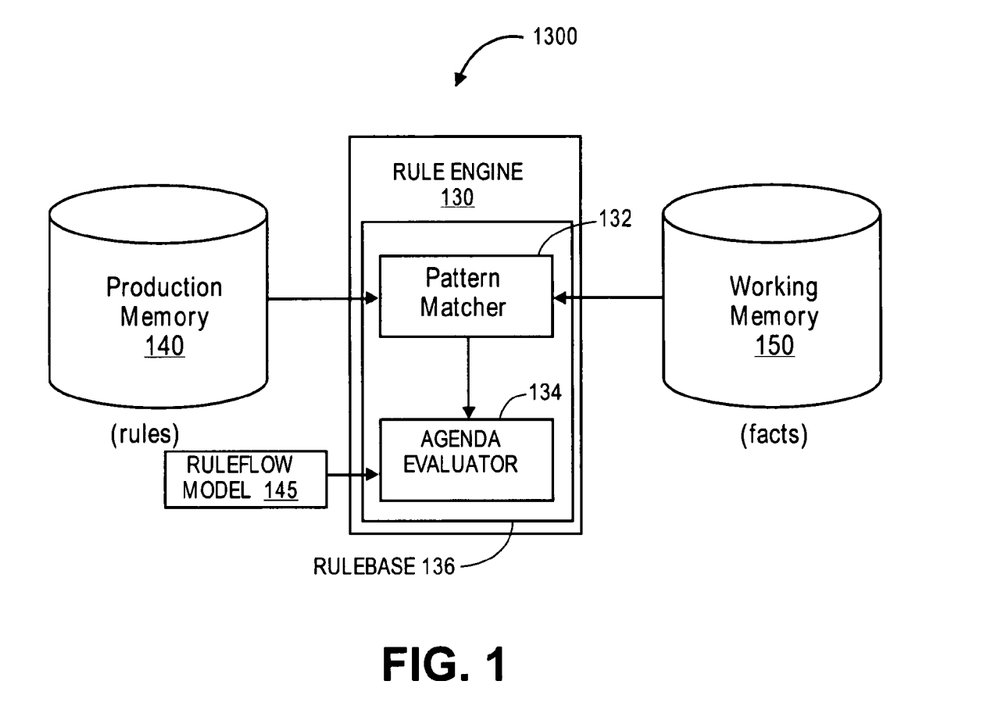
FIG. 1 illustrates one embodiment of a Production Rule System.

In some embodiments, a production rule system is an expert system adopting a rule-based approach. FIG. 1 illustrates one embodiment of a production rule system. The Production Rule System 1300 includes a Rule Engine 130, a Working Memory 150, and a Production Memory 140. The Working Memory 150 stores facts, while the Production Memory 140 stores rules. Broadly speaking, facts are application data passed from an application as objects (e.g., Java beans) and asserted into the Working Memory 150. After being asserted into the Working Memory 150, the facts are accessible by the rules. In some embodiments, the Rule Engine 130 uses references and/or pointers to access the facts.

The Rule Engine 130 further includes a runtime (a.k.a. RuleBase 136). The brain of the Production Rules System 1300 is the Rule Engine 130, which is scalable to a large number of rules and facts. The Rule Engine 130 may also be referred to as an Inference Engine. The Rule Engine 130 matches the facts against the rules to infer conclusions, which result in Actions. More details of the Rule Engine 130 and the RuleBase 136 are discussed below.

In some embodiments, the facts that the Rule Engine 130 matches against are in the Working Memory 150, while the rules are in the Production Memory 140. Facts are asserted into the Working Memory 150, where the facts asserted may then be modified and/or retracted. Furthermore, a system with a large number of rules and facts may result in many rules being true for the same fact assertion, and these rules are said to be in conflict. A ruleflow model defining an execution order of rules may be loaded into the Rule Engine 130 and the Working Memory 150 for managing the execution of rules. More details on the ruleflow model are discussed below.

There are two ways of execution for production rule systems, namely Forward Chaining and Backward Chaining. Production rule systems that implement both are called hybrid production rule systems. Forward chaining is data-driven and thus, reactionary. Facts are asserted into the working memory, which results in one or more rules being concurrently true and scheduled for execution in the Agenda. In other words, the process starts with one or more facts, which propagates along the process, and the process ends in a conclusion.

Contrary to forward chaining, backward chaining is goal-driven. In other words, the process starts with a conclusion which the rule engine tries to satisfy. If the rule engine cannot satisfy the conclusion, the rule engine searches for other conclusions referred to as sub-goals, that help satisfy an unknown part for the current goal. This process continues until either the initial conclusion is satisfied or there are no more sub-goals. Prolog is an example of a backward chaining engine.

Note that the concept disclosed herein may be applied to rule engines that adopt forward chaining, backward chaining, or a combination of both. Details of some embodiments of a rule engine that adopts forward chaining are described below as examples to illustrate the concept.

Overview of a Rule Engine

In some embodiment, a rule engine has two main parts, namely authoring and runtime. Authoring involves the creation of files for rules, which may be written in a markup language (e.g., Extensible Markup Language (XML), Drool's Rule Language (DRL)). The files for rules are input into a parser, which may then be parsed using ANTLR 3 (Another Tool for Language Recognition, version 3) grammer. The parser checks for correctly formed grammer and produces an intermediate structure, such as a "descr" abstract syntax tree (AST), where descr indicates the AST "describes" the rules. The AST is then passed to a PackageBuilder which produces packages based on the AST. PackageBuilder may also undertake any code generation and compilation that is necessary for the creation of the Package. More details of authoring are described below.

Figure 2:
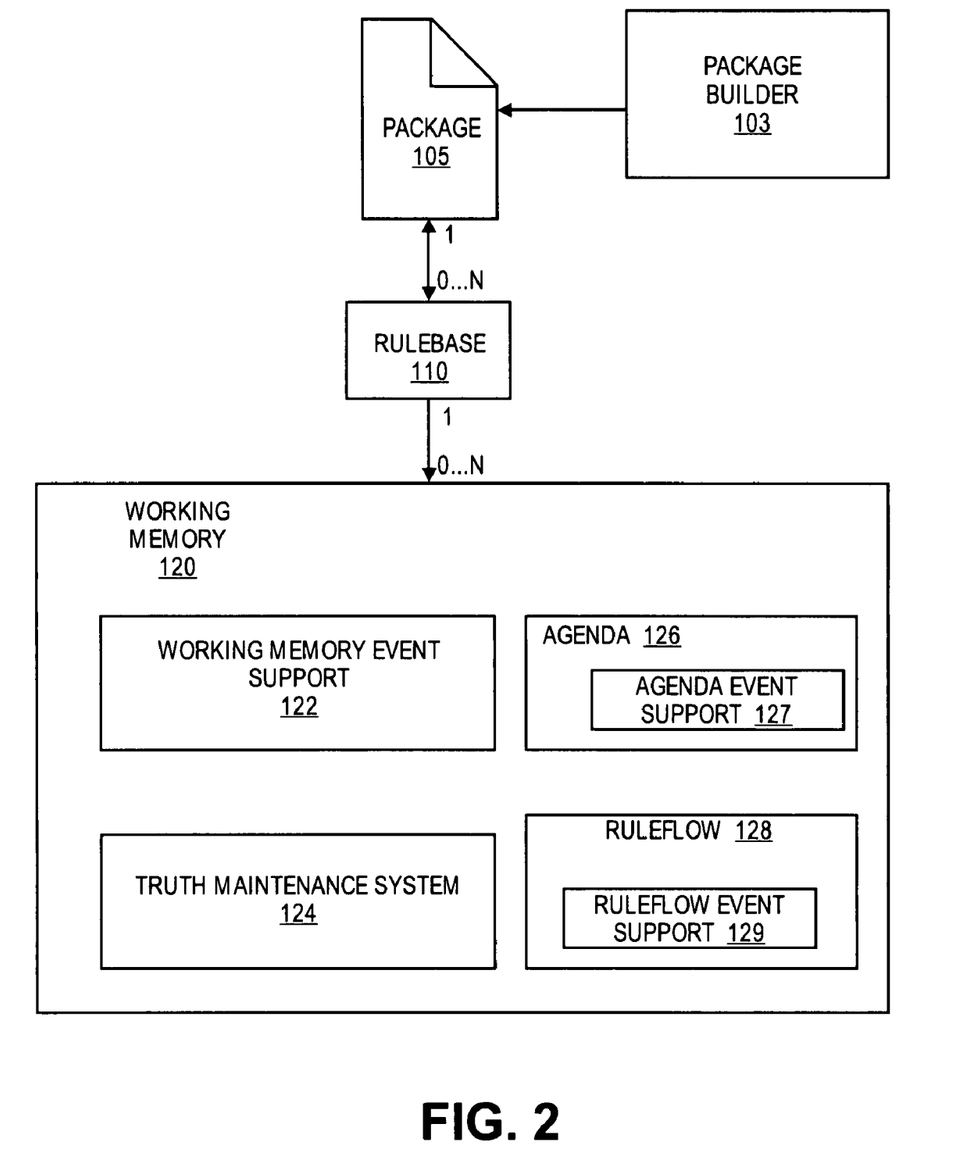
FIG. 2 illustrates one embodiment of a RuleBase.

As mentioned above, the runtime of the rule engine is also referred to as a RuleBase. FIG. 2 illustrates one embodiment of a RuleBase. RuleBase 110 is a runtime component which includes one or more packages 105. Note that packages can be added and removed from the RuleBase 110 at any time. The RuleBase 110 may instantiate one or more working memories. The RuleBase 110 in FIG. 2 has instantiated a Working Memory 120. Working Memory 120 has a number of sub-components, including Working Memory Event Support 122, Truth Maintenance System 124, Agenda 126, and Agenda Event Support 127. In some embodiments, an instance of a ruleflow model 128 may be created in Working Memory 120. The ruleflow model 128 defines the order in which rule sets should be executed, and conditions, if any, under which the rule sets should be executed. Further, Working Memory 120 provides a Ruleflow Event Support 129 to support ruleflow. More details about the ruleflow model 128 are described below.

Authoring

As mentioned above, authoring involves the creation of files for rules. In one embodiment, three classes are used for authoring with DrlParser, XmlParser, and PackageBuilder. Two of the parser classes produce descr AST models from a Reader instance provided. PackageBuilder provides convenience APIs (also referred to as convenience methods). Some examples of the convenience methods include "addPackageFromDrl" and "addPackageFromXml," where both take an instance of Reader as an argument.

The above example shows how to build a package, which includes rules from both an XML source and a DRL source, which are in the classpath. Note that all added package sources are of the same package namespace for the current PackageBuilder instance.

In some embodiments, PackageBuilder is configurable using PackageBuilderConfiguration. PackageBuilderConfiguration has default values that may be overridden programmatically via setters and/or on first use via property settings. Further, one embodiment of PackageBuilderConfiguration allows alternative compilers (e.g., Janino, Eclipse Java Development Tool (JDT), etc.) and different Java Development Kit (JDK) source levels (e.g., "1.4," "1.5," etc.) to be specified. PackageBuilderConfiguration may further include a parent class loader. In one embodiment, the default compiler is Eclipse JDT Core at source level "1.4" with the parent class loader set to "Thread.currentThread( ).getContextClassLoader( )".

In some embodiments, the compiler may be specified programmatically. Alternatively, the compiler may be specified with a property file setting.

RuleBase

As mentioned above, a RuleBase is the runtime of a rule engine. A RuleBase has loaded one or more packages of rules (or rule sets), ready to be used. The rules may have been validated and/or compiled during authoring. To control the execution order of the rules, the RuleBase may further load a ruleflow model. More details of the ruleflow model is discussed below. In some embodiments, a RuleBase is serializable so it can be deployed to services, such as Java Naming and Directory Interface (JNDI). In some embodiments, a RuleBase is generated and cached on first use in order to save on the continually re-generation of the RuleBase, which is expensive. A RuleBase is instantiated using a RuleBaseFactory. In some embodiments, the RuleBaseFactory returns a Rete Object-Oriented (ReteOO) RuleBase by default. Arguments can be used to specify ReteOO or Leaps. Packages are added, in turn, using an addPackage method. Packages of any namespace and multiple packages of the same namespace may be added.

In some embodiments, a RuleBase instance is threadsafe, in the sense that one rule instance may be shared across multiple threads in an application (e.g., a web application). One common operation on a RuleBase is to create a new working memory.

A RuleBase may hold weak references to any working memories that the RuleBase has instantiated. Thus, if rules are changed, added, removed, etc., the rules in the working memory can be updated with the latest rules without having to restart the working memory. Alternatively, a RuleBase may not hold any weak reference to a working memory if the RuleBase cannot be updated.

In some embodiments, packages can be added and removed at any time. All changes may be propagated to the existing working memories. Then fireAllRules( ) may be called to fire the resulting Activations.

In some embodiments, an individual rule cannot be added to a working memory by itself. In order to add an individual rule, a new package containing the individual rule is created and then added to the working memory.

Working Memory

In some embodiments, a working memory is the main class for using the rule engine at runtime. The working memory holds references to data that has been "asserted" into the working memory (until retracted). Further, the working memory is the place where the interaction with the application occurs. Working memories are stateful objects. They may be shortlived, or longlived. If a rule engine is executed in a stateless manner, then a RuleBase object is used to create a new working memory for each session, and the working memory is discarded when the session is finished. Note that creating a working memory is typically a low cost operation. In an alternative approach, a working memory is kept around for a longer time (such as a conversation) and kept updated with new facts. To dispose of a working memory, a dispose( ) method may be used. The dispose( ) method removes the reference from the parent RuleBase. Since this is a weak reference (as discussed above in the section on RuleBase), so the reference would eventually be garbage collected. The term working memory action may refer to assertions, retractions, and modifications of facts in the working memory.

Assertion

Assertion broadly refers to the act of telling a working memory about a set of facts. One example to assert a fact, "yourObject," to a working memory is "WorkingMemory.assertObject(yourObject)." When a fact is asserted in a working memory, the fact is examined for matches against rules in the working memory. Thus, all of the work may be done during assertion; however, in some embodiments, no rules are executed until "fireAllRules( )" is called after asserting the facts.

When a fact is asserted in a working memory, the rule engine returns a FactHandle. This FactHandle is a token used to represent the asserted fact inside the working memory. The FactHandle is also a reference to the fact by which one may interact with the working memory when retracting and/or modifying the fact.

Retraction

"Retraction" generally refers to causing a rule engine not to track or match a fact previously asserted into a working memory. In other words, when a fact is retracted from the working memory, the rule engine no longer tracks and matches that fact, and any rules that are activated and dependent on that fact may be cancelled. Note that it is possible to have rules that depend on the "non-existence" of a fact, in which case retracting a fact may cause a rule to activate (e.g., rules having the "not" and "exist" keywords). Retraction is done using the FactHandle that has been returned during the assertion.

Modification

Modification broadly refers to changing a fact. In general, a rule engine has to be notified of modified facts, so that the modified facts can be re-processed. In some embodiments, a modification includes a retraction followed by an assertion such that the modification clears the working memory and then starts again. One way to perform a modification is to use a modifyObject method to notify the working memory of changed objects that are not able to notify the working memory themselves. In some embodiments, modifyObject takes the modified object as a second parameter, so that new instances for immutable objects may be specified.

Agenda

During a single working memory action, multiple rules may become fully matched and eligible for execution. When a rule is fully matched, the rule is activated by creating an activation to reference the rule and the matched facts. Conventionally, activations are placed onto the Agenda, which controls the execution order of these activations using a conflict resolution strategy.

Agenda Groups

Agenda Groups are used as a way to partition rules on the Agenda. At any one time, only one agenda group has "focus" (which is also referred to as a focus group). In some embodiments, only activations for rules in a focus group may take effect. In some embodiments, some predetermined rules may have "auto focus," which means the focus for the corresponding Agenda Group is taken automatically when the conditions of the rules in the Agenda Group are met.

Agenda Groups are also referred to as "modules" in C Library Integrated Production System (CLIPS) terminology. Agenda Groups may be used to create a "flow" between grouped rules. One can switch between Agenda Groups either from within the rule engine, or from the API. Agenda Groups are useful for rules having a clear need for multiple "phases" and/or "sequences" of processing.

In some embodiments, each time setFocus( . . . ) is called for an Agenda Group, the method pushes that Agenda Group onto a stack. When the focus group is empty, the focus group is popped off and the next one of the stack evaluates. An Agenda Group can appear in multiple locations on the stack. In some embodiments, the default Agenda Group is "MAIN," where all rules that do not specify an Agenda Group are placed into the default Agenda Group. In some embodiments, MAIN is also always the first group on the Stack and given focus by default.

The following example illustrates one use of the Agenda Group. For a credit card processing application, transactions are processed for a given account. There is a working memory accumulating knowledge about a single account transaction. The rule engine is operable to decide if transactions are possibly fraudulent or not. A RuleBase of the rule engine basically has a first set of rules that kick in when there is a reason to be suspicious and a second set of rules that kick in when everything is normal.

Note that there are possibly many reasons as to what could trigger a reason to be suspicious, such as, for example, someone notifying the bank, a sequence of large transactions, transactions for geographically disparate transactions, or even reports of credit card theft. Rather then smattering all the little conditions into lots of rules, a fact class called "SuspiciousAccount" is created.

Then there can be a series of rules whose job is to look for things that may raise suspicion, and if these rules fire, these rules simply assert a new SuspiciousAccount( ) instance. All the other rules just have conditions like "not SuspiciousAccount( )" or "SuspiciousAccount( )" depending on their needs. Note that this has the advantage of allowing there to be many rules around raising suspicion, without touching the other rules. When the facts causing the SuspiciousAccount( ) assertion are removed, the rule engine reverts back to the normal "mode" of operation. For instance, a rule with "not SuspiciousAccount( )" may kick in, which flushes through any interrupted transactions. Although Agenda Groups may be used to partition rules on the Agenda, and hence, to create a flow between grouped rules, it gets more and more difficult and error-proned to create a flow using Agenda Groups as the number of rules increases. To make the creation of a flow between rules easier for users, the concept of ruleflow and a tool for defining ruleflows are provided in some embodiments as discussed below.

RuleFlow

As mentioned above, a ruleflow as used herein broadly refers to the order in which a number of rules and/or rule sets should be executed by a rule engine and conditions, if any, under which the rules should be executed. Note that each rule set includes one or more rules. In some embodiments, a ruleflow definition may be represented as a network of connected nodes. A graph of the connected nodes may be automatically created when the rule engine loads a ruleflow model containing the ruleflow definition. When a ruleflow is started, an instance of the ruleflow is created, which contains the runtime state about the ruleflow, such as, for example, which nodes have been executed, etc. Whenever a node has been completed (i.e., all rules associated with the node have been executed), the rule engine looks up the next node based on the current execution state and the definition and start executing the next node.

Figure 3A:
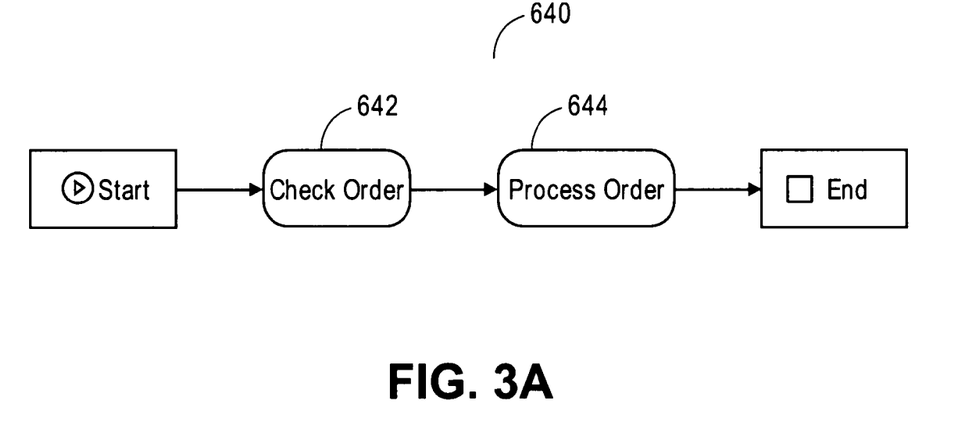
FIG. 3A shows a first example of a flowchart created using one embodiment of a ruleflow defining GUI.

In some embodiments, a tool is provided to allow users to readily define a ruleflow. The tool includes a graphical user interface (GUI), which allows users to create a flowchart to specify the order in which rule sets should be executed and/or conditions under which the rule sets should be executed. Since a ruleflow definition may be represented as a network of connected nodes, it is easier for users to define the ruleflow using a flowchart. For example, a user may specify which rule sets should be executed in a particular sequence or in parallel, conditions under which rule sets should be executed, etc. One example of a flowchart created using the GUI is shown in FIG. 3A. Referring to FIG. 3A, the flowchart 640 specifies two rule sets, namely check order 642 and process order 644, to be executed sequentially. Specifically, the rule set check order 642 should be executed before the rule set process order 644 is executed.

Figure 3B:
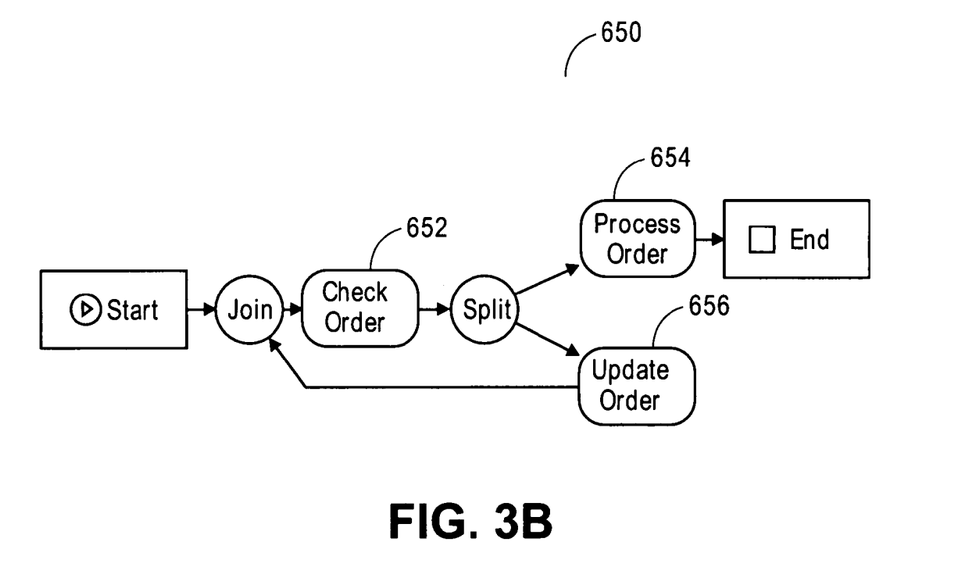
FIG. 3B shows a second example of a flowchart created using one embodiment of a ruleflow defining GUI.

FIG. 3B shows another example of a flowchart created using the GUI. Referring to FIG. 3B, the flowchart 650 specifies both parallelism and conditional execution of some rule sets. Specifically, the rule set process order 654 and the rule set update order 656 should be executed in parallel and the rule set process order 654 should only be executed if no errors are found when executing the rule set check order 652.

Figure 3C:
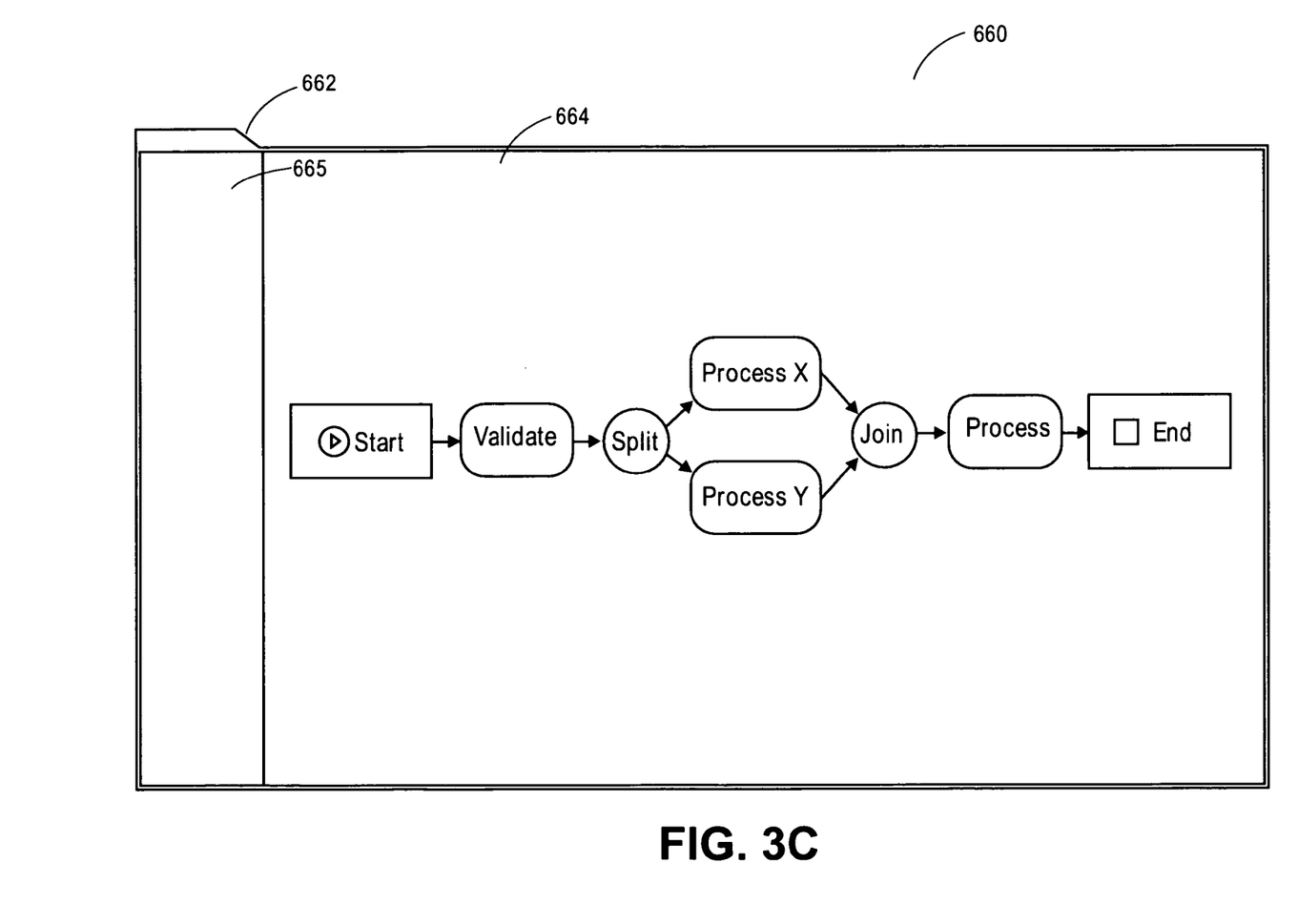
FIG. 3C shows one embodiment of an editor.

In some embodiments, the GUI includes an editor to create ruleflow files (*.rf) to store graphical information of the flowcharts. One embodiment of such an editor is shown in FIG. 3C. Referring to FIG. 3C, the GUI 660 includes an editor 662, which further includes some user interface controls 665 and a display 664. Using the user interface controls 665, a user may create a flowchart to describe the order in which some rule sets should be executed. For example, some of the user interface controls 665 allows the user to specify the starting point and the end point of the ruleflow, which rule set(s) should be executed prior to another rule set, the condition upon which a rule set could be executed, which rule sets should be executed in parallel, etc. The display 664 shows the flowchart as the flowchart is being created. Some examples of the flowchart have been described above with reference to FIGS. 3A and 3B. After creating the flowchart, the user may verify the flowchart as shown in the display 664. Then the user may save the graphical information of the flowchart into a ruleflow file by actuating a user interface control, such as a save button from a menu. In addition, the ruleflow file contains the definition of the ruleflow. In some embodiments, the ruleflow file is a text file.

When the user attempts to save the ruleflow file, a corresponding model file (*.rfm) is created, which is also referred to as a "ruleflow model" or simply as a "model." The model file contains the definition of the ruleflow without the graphical information of the flowchart. The model file may be provided to the rule engine, which may follow the corresponding ruleflow defined to execute rule sets. In some embodiments, model files containing definitions of ruleflows may be added to a RuleBase in substantially the same way rules are added to the RuleBase. Details of one embodiment of a process to load a ruleflow definition to a RuleBase are discussed below.

A Process to Define Ruleflow

Figure 4:
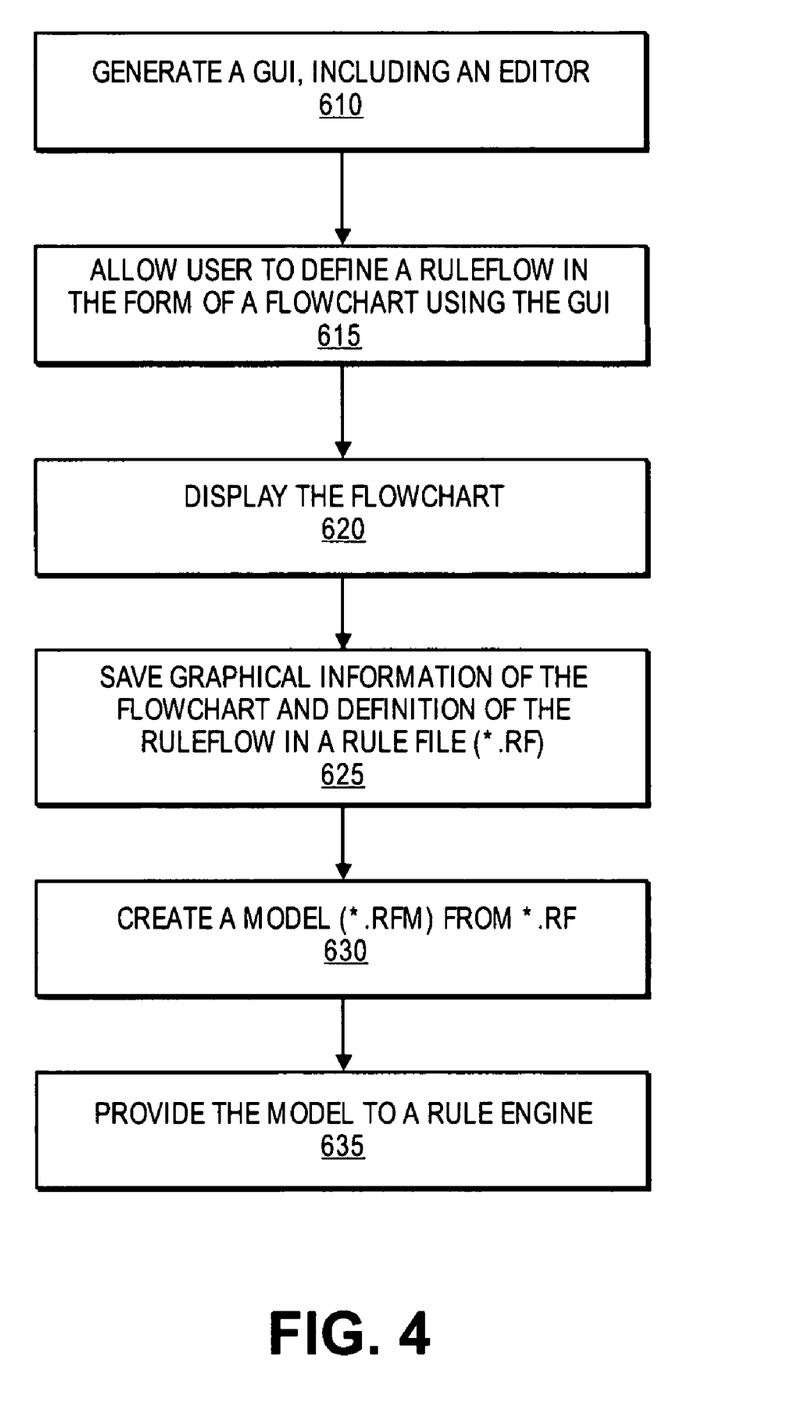
FIG. 4 shows one embodiment of a process to define a ruleflow.

FIG. 4 illustrates one embodiment of a process to define a ruleflow. The process may be performed by processing logic that may comprise hardware (e.g., circuitry, dedicated logic, programmable logic, microcode, etc.), software (such as instructions run on a processing device), firmware, or a combination thereof. For example, a computing machine illustrated in FIG. 8 may perform at least part of the process described below.

Referring to FIG. 4, processing logic generates a GUI, including an editor (processing block 610). One example of the GUI has been described above with reference to FIG. 3C. Processing logic allows a user to define a ruleflow in the form of a flowchart using the GUI (processing block 615). The ruleflow dictates an execution order of rules, which may be grouped into one or more rule sets. Processing logic also displays the flowchart via a display within the GUI so that the user may verify the flowchart created (processing block 620). Once the user finishes creating the flowchart and confirms the flowchart is correct, processing logic saves graphical information of the flowchart and definition of the ruleflow in a ruleflow file (processing block 625). In some embodiments, the ruleflow file is a text file and has an extension of ".rf." In addition to saving the graphical information, processing logic creates a ruleflow model, or simply referred to as a model, from the rule file (processing block 630). The ruleflow model contains information of the ruleflow usable by rule engines. In some embodiments, the ruleflow model has an extension of ".rfm." Finally, processing logic provides the ruleflow model to a rule engine (processing block 635). Based on the ruleflow model, the rule engine may execute rule sets in an order as previously defined by the user. For example, the user may have defined a first rule set to be executed prior to a second rule set, a third rule set to be executed in parallel with the second rule set, and/or conditions which have to be met before executing the first rule set, etc.

Figure 5:
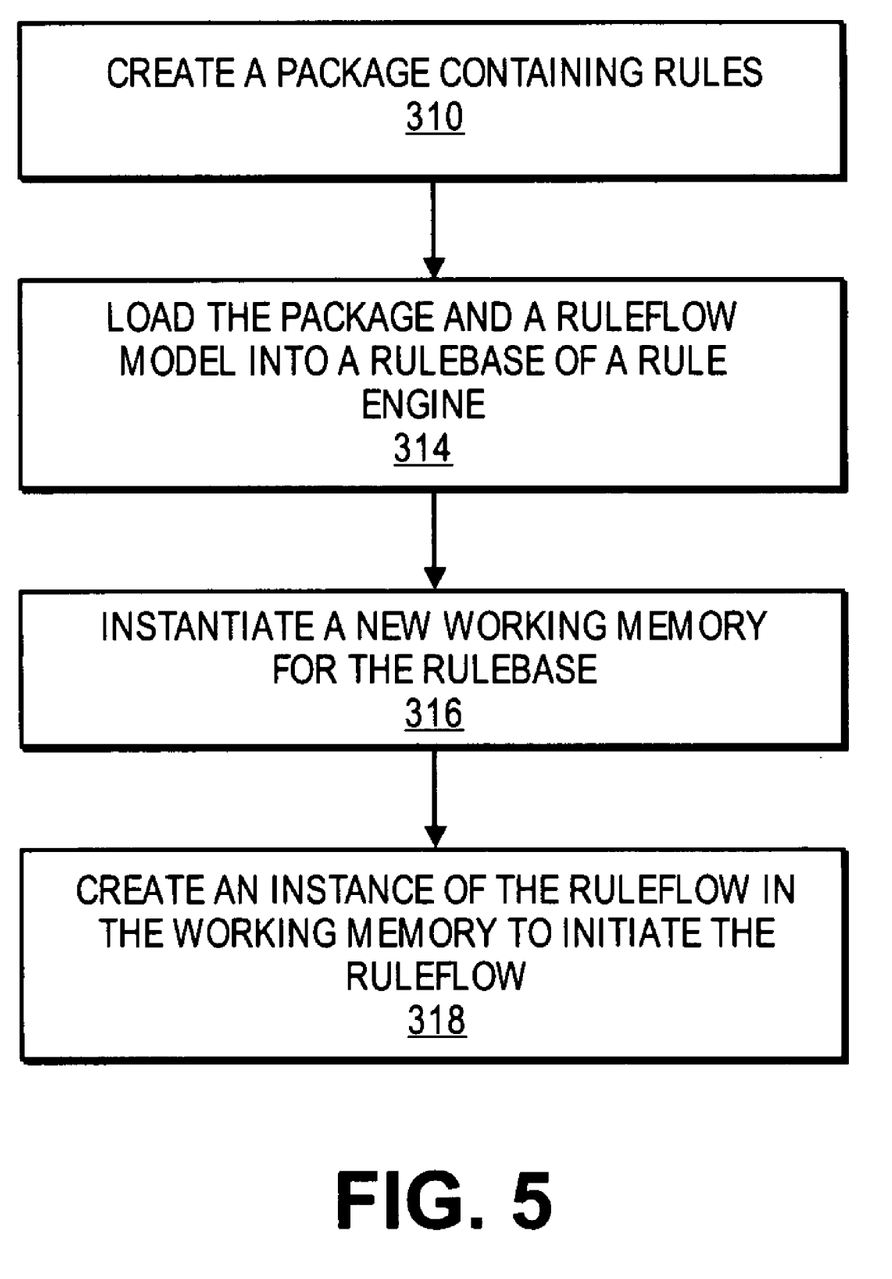
FIG. 5 illustrates one embodiment of a process to provide a ruleflow model to a rule engine.

FIG. 5 illustrates one embodiment of a process to load a ruleflow model to a rule engine. The process may be performed by processing logic that may comprise hardware (e.g., circuitry, dedicated logic, programmable logic, microcode, etc.), software (such as instructions run on a processing device), firmware, or a combination thereof. For example, a computing machine illustrated in FIG. 8 may perform at least part of the process described below.

Referring to FIG. 5, processing logic creates a package containing rules (processing block 310). Processing logic loads the package and a ruleflow model into a RuleBase of the rule engine (processing block 314). As discussed above, the RuleBase is a runtime of the rule engine. Next, processing logic instantiates a new working memory for the RuleBase (processing block 316). Some embodiments of instantiation of a new working memory have been discussed above. To initiate the ruleflow, processing logic creates an instance of the ruleflow in the working memory (processing block 318). Then the rule engine may execute rules according to the ruleflow as discussed below.

Figure 6A:
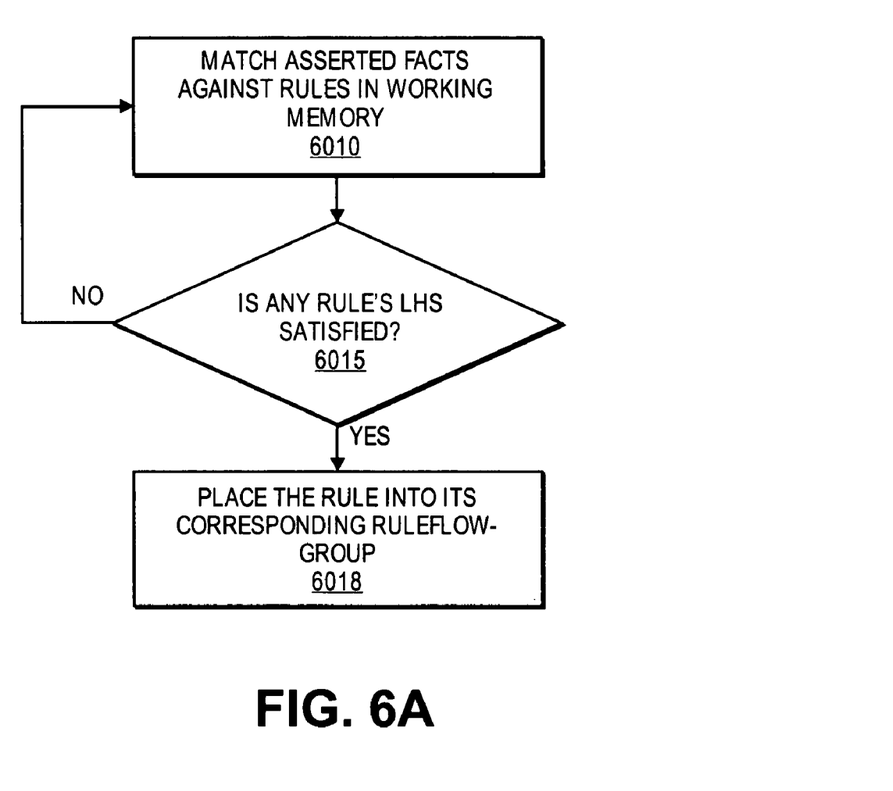
FIGS. 6A and 6B show one embodiment of a process to execute rules according to a ruleflow.
Figure 6B:
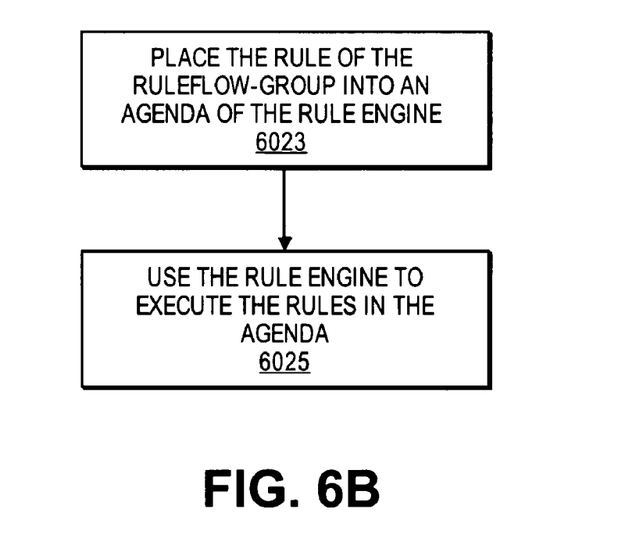

FIGS. 6A and 6B show one embodiment of a process to execute rules based on a ruleflow using a rule engine. Note that the RuleBase of the rule engine has loaded a ruleflow model containing a definition of the ruleflow as described above. Thus, the ruleflow definition controls the execution of the rules. The process may be performed by processing logic that may comprise hardware (e.g., circuitry, dedicated logic, programmable logic, microcode, etc.), software (such as instructions run on a processing device), firmware, or a combination thereof. For example, a computing machine illustrated in FIG. 8 may perform at least part of the process described below.

Referring to FIG. 6A, processing logic matches asserted facts against rules in a working memory of the rule engine (processing block 6010). Processing logic checks if there is any rule's LHS been satisfied (processing block 6015). If none, processing logic returns the processing block 6010 to repeat the above operations. If the LHS conditions of one of the rules are satisfied, then processing logic places this rule into a corresponding ruleflow-group (processing block 6018). In some embodiments, there are multiple ruleflow-groups defined. For each ruleflow-group, one or more rules are associated with the respective ruleflow-group such that, when the rules are activated, the rules are placed into the respective ruleflow-group.

As mentioned above, the ruleflow definition controls the execution of the rules. When the ruleflow definition decides that a specific ruleflow group should be executed, processing logic performs the process illustrated in FIG. 6B. Referring to FIG. 6B, processing logic places all of the rules in the ruleflow-group into an agenda of the rule engine (processing block 6023). Then processing logic uses the rule engine to execute the rules in the agenda (processing block 6025). When the ruleflow-group is emptied, the ruleflow-group may signal that execution of the associated rules have been finished. Then processing logic may trigger the next node in the ruleflow definition.

In some embodiments, a ruleflow definition may include special types of nodes, such as splits and joins. Each type of nodes defines what should happen when the rules associated with the node are executed. For each type of nodes, there may be a class that defines the behavior of the type of nodes. Following are some examples of various types of nodes and their corresponding behavior. However, it should be appreciated that the following list of examples are not exhaustive. For a ruleflow node, all rules in a corresponding ruleflow-group are executed when the ruleflow node is triggered. For an AND split node, all outgoing nodes are triggered when the AND split node is triggered. For an AND join node, whenever an incoming connection is completed, the state of the process instance is updated. If all incoming connections have been completed, the outgoing node is triggered. For an OR split node, a constraint may be linked to each outgoing connection. The OR split may only trigger those connections whose constraint is satisfied. Special rules may be used to evaluate these conditions. Thus, these special rules are responsible for evaluating these conditions when the OR split node is executed.

An Apparatus to Define a Ruleflow

Figure 7A:
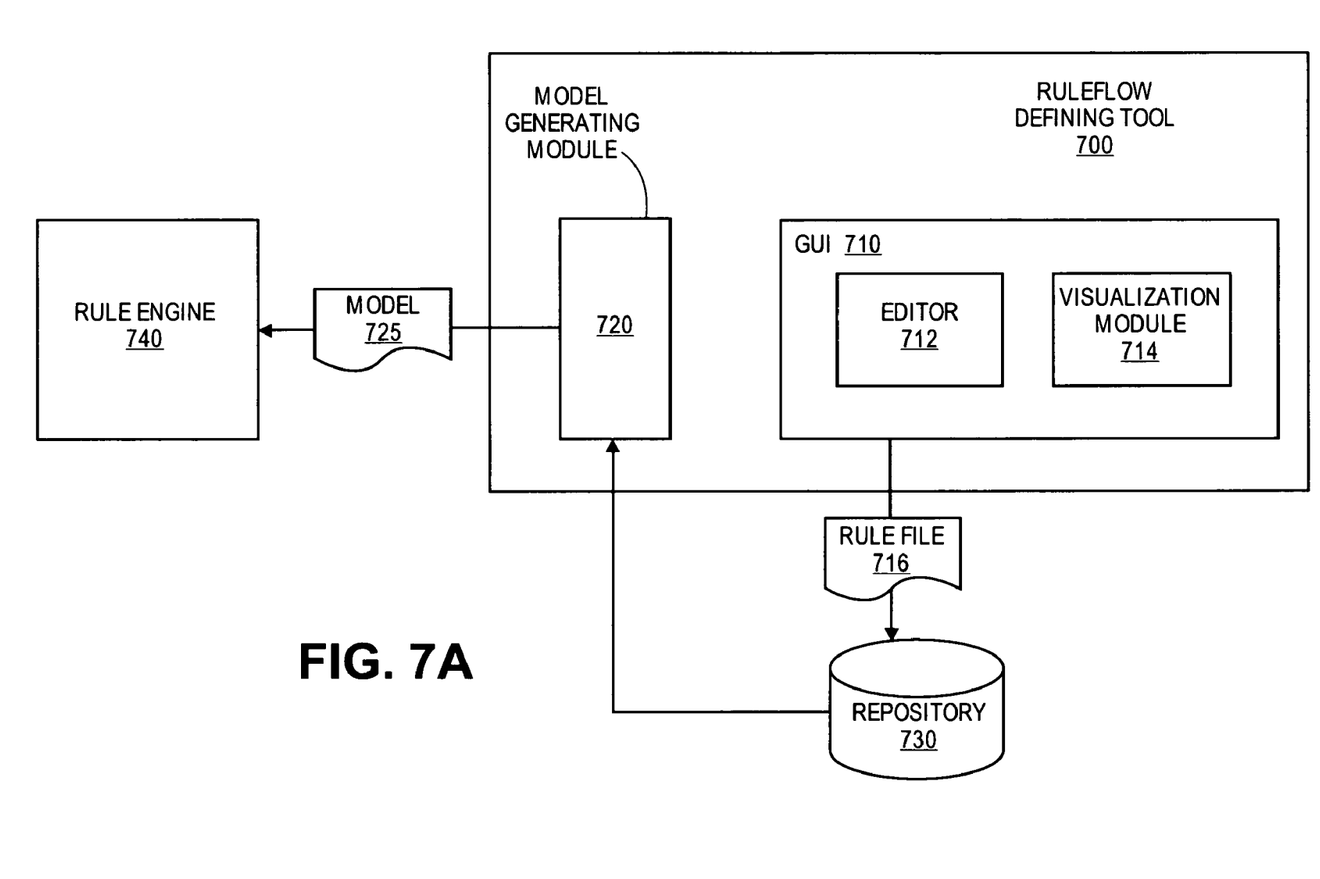
FIG. 7A shows one embodiment of a graphical ruleflow defining tool.

FIG. 7A shows one embodiment of a graphical ruleflow defining tool 700. The graphical ruleflow defining tool 700 includes a GUI module 710 and a model generating module 720. The GUI module 710 further includes an editor 712 and a visualization module 714. The ruleflow defining tool 700 is operatively coupled to a repository 730 and a rule engine 740.

In some embodiments, the GUI module 710 generates a GUI to allow a user to define a ruleflow. For example, the GUI module 710 includes an editor 712 to allow the user to graphically specify the sequence of execution of a number of rule sets, such as in the form of a flowchart. One example of the editor 712 has been described above with reference to FIG. 3C. The GUI module 710 further includes the visualization module 714, which may display the flowchart as the flowchart is being created using the editor 712 and/or after the flowchart has been created. As such, the user may verify that the flowchart correctly represents the evaluation order desired. The GUI module 710 may provide one or more user interface controls (e.g., buttons) to allow the user to confirm that the flowchart created correctly represents the evaluation order desired. Once the user has confirmed so, the graphical information of the flowchart is saved into a rule file 716, which may be stored in the repository 730.

In some embodiments, the model generating module 720 creates a rule model 725, or simply referred to as a model, based on the graphical information in the ruleflow file 716. For example, the model generating module 720 may retrieve the ruleflow file 716 from the repository 730 and extracts the execution order from the graphical information in the ruleflow file 716. Then the model generating module 720 may create the ruleflow model 725 to model the execution order. Finally, the ruleflow model 725 is provided to the rule engine 740, which may execute rule sets according to the ruleflow model 725. As such, the rule engine 740 may execute the rule sets in the execution order specified by the user. Details of some embodiments of the rule engine 740 have been described above.

System Architecture

Figure 7B:
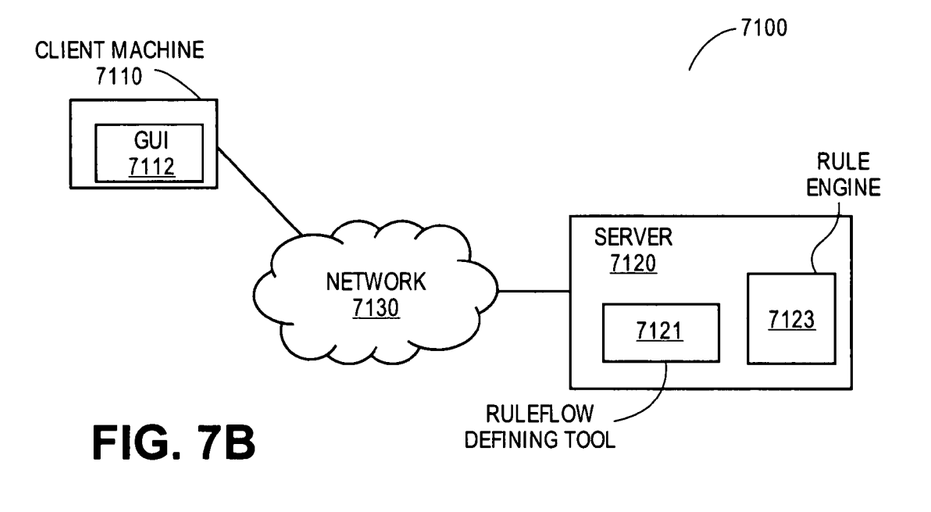
FIG. 7B shows one embodiment of a system usable with some embodiments of the present invention.

FIG. 7B illustrates one embodiment of a system usable with some embodiments of the present invention. The system 7100 includes a client machine 7110 and a server 7120, which are coupled to each other via a network 7130. The client machine 7110 may include a computing machine, such as a desktop personal computer (PC), a laptop PC, a personal digital assistant (PDA), a mobile telephone, etc. The network 7130 coupling the client machine 7110 to the server 7120 may include various kinds of networks, such as an intranet, the Internet, etc. The server 7120 may be implemented using a machine as illustrated in FIG. 8.

In some embodiments, the server 7120 includes a ruleflow defining tool 7121 and a rule engine 7123. The ruleflow defining tool 7121 generates a GUI to allow users to graphically define a ruleflow. The GUI 7112 may be presented to the user via the client machine 7110. Details of some embodiments of the ruleflow defining tool 7121 have been described above. In addition to the ruleflow defining tool 7121, the server 7120 may include a rule engine 7123 to execute rules according to the ruleflow defined.

Figure 7C:
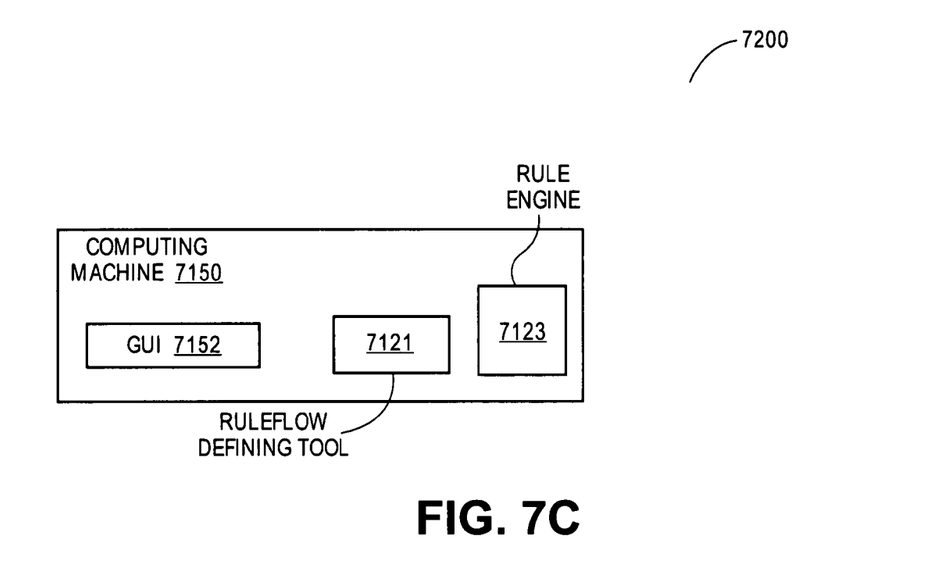
FIG. 7C shows an alternate embodiment of a system usable with some embodiments of the present invention.

FIG. 7C illustrates an alternate embodiment of a system usable with some embodiments of the present invention. The system 7200 includes a computing machine 7150, which may be implemented using the machine illustrated in FIG. 8. The computing machine 7150 includes a ruleflow defining tool 7151, a rule engine 7153, and a GUI 7152. In some embodiments, the ruleflow defining tool 7151 generates the GUI 7152 to allow users to define ruleflow using the GUI 7152. Then the rule engine 7153 may execute rules according to the ruleflow defined. Details of some embodiments of the ruleflow defining tool 7151, the rule engine 7153, and the GUI 7152 have been described above.

Figure 8:
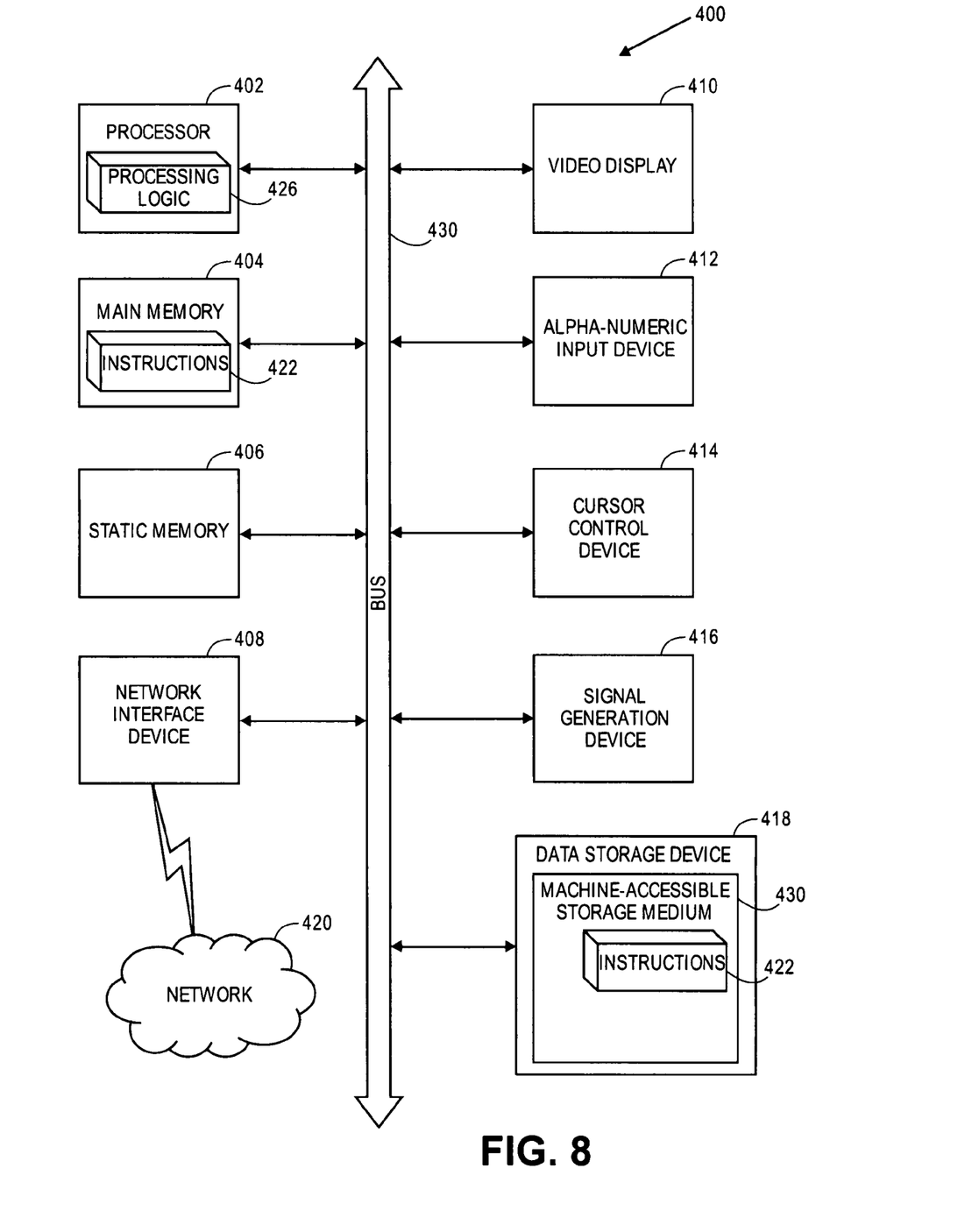
FIG. 8 illustrates a block diagram of an exemplary computer system.

FIG. 8 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and an apparatus to define a ruleflow have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
generating a graphical user interface (GUI) to allow a user to enter graphical information to specify an execution order of a plurality of rules; and
executing the plurality of rules using a rule engine according to the execution order.

2. The method of claim 1, wherein generating the GUI comprises:
generating an editor having one or more user interface (UI) controls to allow the user to create a flowchart defining the execution order; and
displaying the flowchart to the user via the editor.

3. The method of claim 1, further comprising:
saving the graphical information in a ruleflow file, wherein the graphical information is associated with a flowchart created with the GUI;
creating a model containing the execution order corresponding to the ruleflow file; and
providing the model to the rule engine.

4. The method of claim 1, further comprising:
loading a model of the execution order to a rulebase of the rule engine;
placing an activated rule into a corresponding ruleflow-group of a plurality of ruleflow-groups;
selecting one of the plurality of ruleflow-groups according to the model;
placing all activated rules in the selected one of the plurality of ruleflow-groups onto an agenda of the rule engine; and
executing rules in the agenda.

5. The method of claim 1, further comprising:
allowing the user to specify at least two of the plurality of rules to be executed in parallel by the rule engine.

6. The method of claim 1, further comprising:
allowing the user to specify at least two of the plurality of rules to be executed sequentially by the rule engine.

7. The method of claim 1, further comprising:
allowing the user to specify at least one of the plurality of rules to be executed by the rule engine only if a predetermined condition occurs.

8. An apparatus comprising:
a graphical user interface (GUI) module to generate a GUI to allow a user to enter graphical information to specify an execution order of a plurality of rules; and
a rule engine coupled to the GUI module to execute the plurality of rules according to the execution order.

9. The apparatus of claim 8, wherein the GUI module comprises:
an editor to allow the user to create a flowchart to define the execution order; and
a visualization module to present the flowchart to the user.

10. The apparatus of claim 8, further comprising:
a storage device to store a ruleflow file containing the graphical information, wherein the graphical information is associated with a flowchart created with the GUI; and
a model creating module to create a model containing the execution order corresponding to the ruleflow file, wherein the model is accessible by the rule engine.

11. The apparatus of claim 8, wherein the GUI comprises a user interface control to allow the user to specify at least two of the plurality of rules to be executed in parallel by the rule engine.

12. The apparatus of claim 8, wherein the GUI comprises a user interface control to allow the user to specify at least two of the plurality of rules to be executed sequentially by the rule engine.

13. The apparatus of claim 8, wherein the GUI comprises a user interface control to allow the user to specify at least one of the plurality of rules to be executed by the rule engine only if a predetermined condition occurs.

14. A system comprising:
a server comprising
a graphical user interface (GUI) module to generate a GUI to allow a user to enter graphical information to specify an execution order of a plurality of rules; and
a rule engine coupled to the GUI module to execute the plurality of rules according to the execution order.

15. The system of claim 14, further comprising:
a client communicatively coupled to the server to present the GUI to the user.

16. The system of claim 14, further comprising:
a database coupled to the server to store a ruleflow file containing the graphical information, wherein the graphical information is associated with a flowchart created with the GUI.

17. The system of claim 14, further comprising:
a database coupled to the server to store a model created based on the execution order.

18. A non-transitory machine-readable storage medium that provides instructions that, if executed by a processor, will cause the processor to perform operations comprising:
generating a graphical user interface (GUI) to allow a user to enter graphical information to specify an execution order of a plurality of rules; and
executing the plurality of rules using a rule engine according to the execution order.

19. The non-transitory machine-readable storage medium of claim 18, wherein generating the GUI comprises:
generating an editor having one or more user interface (UI) controls to allow the user to create a flowchart defining the execution order; and
displaying the flowchart to the user via the editor.

20. The non-transitory machine-readable storage medium of claim 18, further comprising:
saving the graphical information in a ruleflow file, wherein the graphical information is associated with a flowchart created with the GUI;
creating a model containing the execution order corresponding to the ruleflow file; and
providing the model to the rule engine.

21. The non-transitory machine-readable storage medium of claim 18, further comprising:
loading a model of the execution order to a rulebase of the rule engine;
placing an activated rule into a corresponding ruleflow-group of a plurality of ruleflow-groups;
selecting one of the plurality of ruleflow-groups according to the model;
placing all activated rules in the selected one of the plurality of ruleflow-groups onto an agenda of the rule engine; and
executing rules in the agenda.

22. The non-transitory machine-readable storage medium of claim 18, further comprising:
allowing the user to specify at least two of the plurality of rules to be executed in parallel by the rule engine.

23. The non-transitory machine-readable storage medium of claim 18, further comprising:
allowing the user to specify at least two of the plurality of rules to be executed sequentially by the rule engine.

24. The non-transitory machine-readable storage medium of claim 18, further comprising:
allowing the user to specify at least one of the plurality of rules to be executed by the rule engine only if a predetermined condition occurs.

* * * * *